July 3, 1951

R. A. FRYKLUND ET AL 2,559,575

ELECTRICAL CONTROL SYSTEM

Filed Jan. 31, 1947

3 Sheets-Sheet 1

Inventors
Robert A. Fryklund
William G. Gorton

By Elmer J. Gorn
Attorney

July 3, 1951 R. A. FRYKLUND ET AL 2,559,575
ELECTRICAL CONTROL SYSTEM
Filed Jan. 31, 1947 3 Sheets-Sheet 2

INVENTOR.
ROBERT A. FRYKLUND
WILLIAM G. GORTON
BY
THEIR ATTORNEY

July 3, 1951 — R. A. FRYKLUND ET AL — 2,559,575
ELECTRICAL CONTROL SYSTEM
Filed Jan. 31, 1947 — 3 Sheets-Sheet 3

INVENTOR.
ROBERT A. FRYKLUND
WILLIAM G. GORTON
BY
THEIR ATTORNEY

Patented July 3, 1951

2,559,575

UNITED STATES PATENT OFFICE 2,559,575

ELECTRICAL CONTROL SYSTEM

Robert A. Fryklund, Somerville, and William G. Gorton, Belmont, Mass., assignors to Raytheon Manufacturing Company, a corporation of Delaware Application January 31, 1947, Serial No. 725,642

10 Claims. (Cl. 90—62)

The present invention relates to means and method for automatically duplicating with precision a desired shape or outline from a sample or template used for that purpose. The invention may be applied to machine shop use and also to general use.

The invention, for instance may be applied to duplicating any regular or non-regular form such as machine elements, pattern plates, dies, cams or other parts and other articles of manufacture by cutting out of a piece of material, the form of a template or other controlling contour.

The invention has general utility and may be used for duplicating outlines which have practically any shape. In the present invention as the tracer head moves along the edges of the pattern, the pressure of the pattern against the tracer produces signals which control the continued movement of the tracer along and in contact with the pattern and the relative movement of a cutting head along a corresponding cutting path which will reproduce the outline of the pattern. The present invention may be associated and used in connection with the invention disclosed in the copending application of Robert A. Fryklund, Serial No. 695,571, filed September 7, 1946, now Patent No. 2,470,244, dated May 17, 1949.

Figure 1:
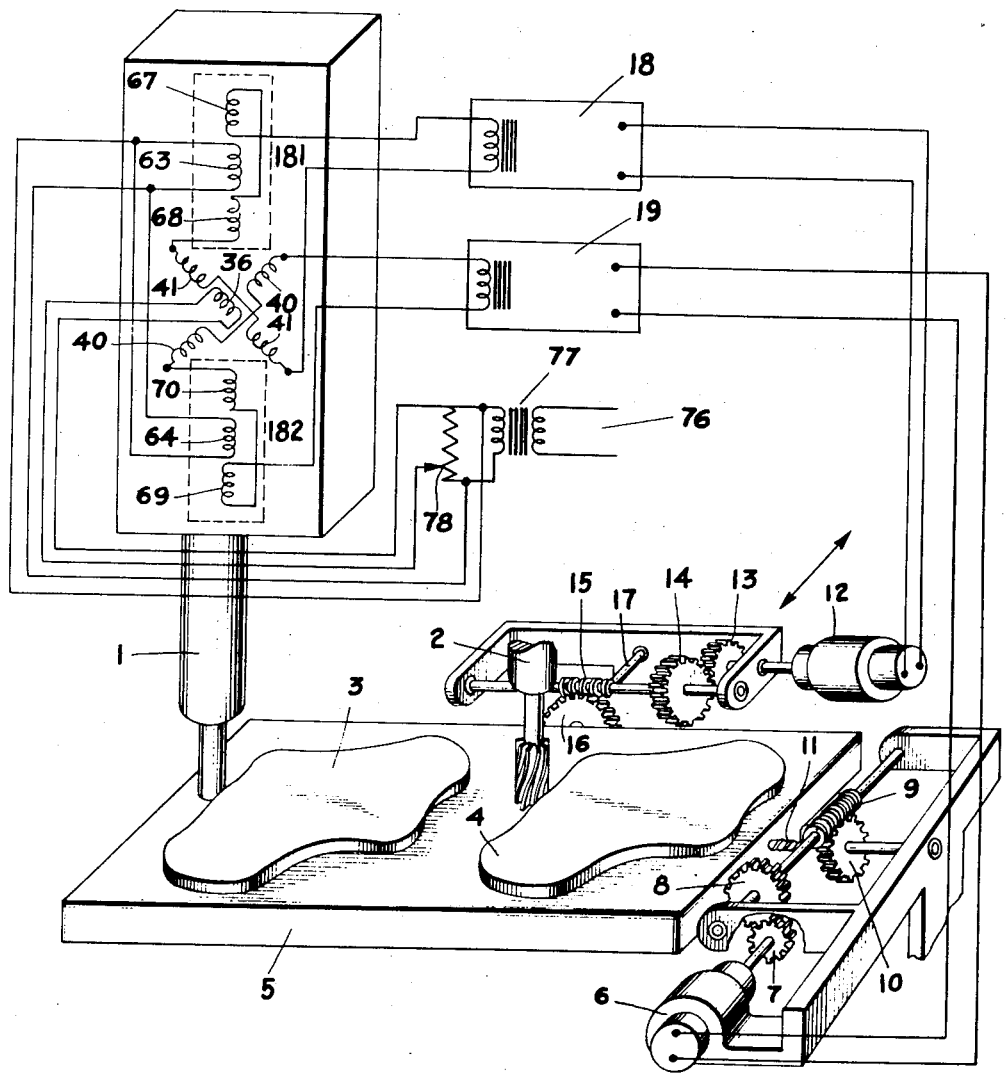
Figure 2:
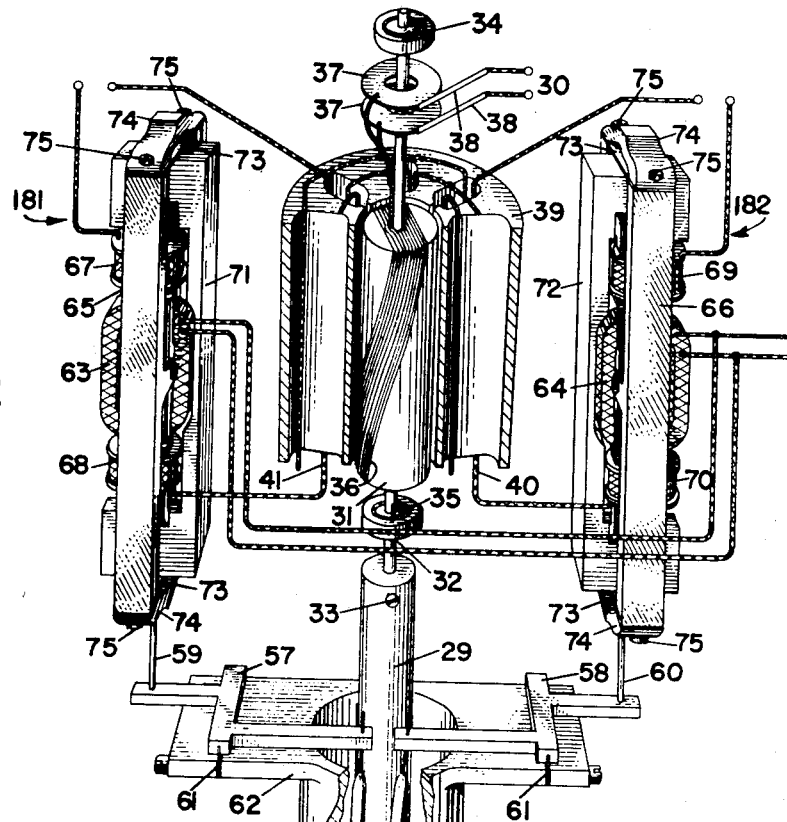
Figure 3:
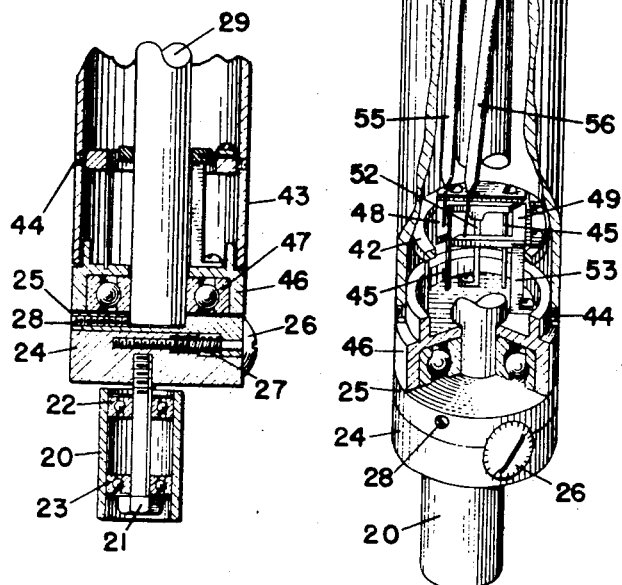
Figures 4, 5:
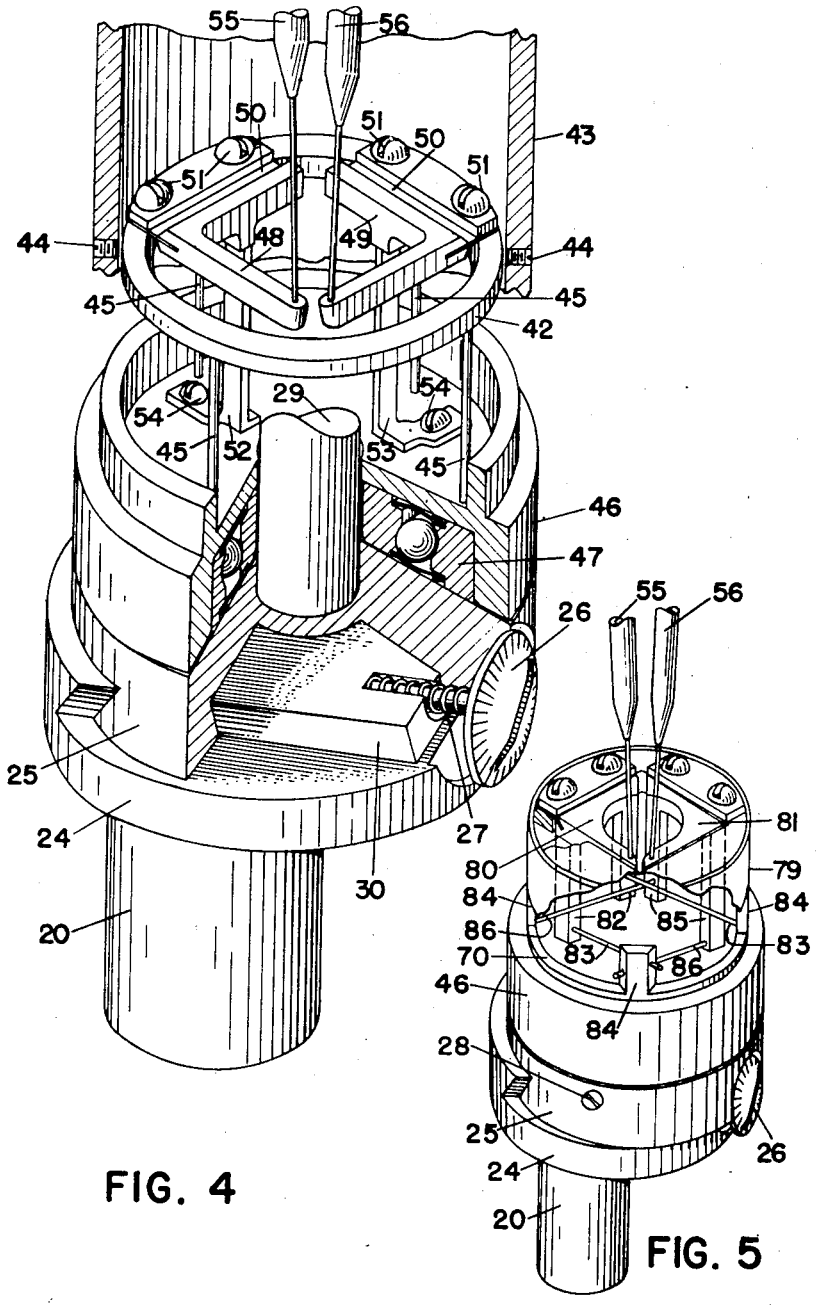

The foregoing and other objects of this invention will be best understood from the following description of an exemplification thereof, reference being had to the accompanying drawings wherein: Figure 1 shows schematically the general system and the electrical circuit diagram of the complete system; Figure 2 illustrates the tracer head in perspective, partly in fragmentary section; Figure 3 shows in elevation a cross sectional view of the lower part of the tracer head; Figure 4 shows in perspective an enlarged cut-away view of the lower part of the tracer head rotated 45° counterclockwise from the position in Figure 2 to show all elements; and Figure 5 illustrates a modified form of the lower part of the tracer head.

Referring first to Fig. 1, which shows the general system, 1 is the tracer head; 2 is the cutter head; 3 is the template which the tracer head follows and 4 is the work being cut. The drive means for the cutter head are not shown in the drawing since the details of the cutter-drive constitute no part of the invention. Both the template 3 and the work 4 are rigidly mounted on a horizontal bed 5. This bed 5 may be the bed of any suitable machine, such as a milling machine, for example. Since the mechanical details of the construction of such machines are well known, and at the same time form no part of the present invention, such details are not illustrated in Fig. 1. In such a machine, the bed 5 is supported in such a manner that it may be moved in either one of two rectangularly related directions lying in a plane parallel to the plane of the bed, under control of screws 11 and 17, for example. The bed may be moved longitudinally in either direction by means of the reversible motor drive 6 and the gears 7, 8, 9, and 10 driving the screw feed 11 and laterally in either direction by means of the reversible motor drive 12 and the gears 13, 14, 15 and 16, driving screw feed 17. The tracer head and cutting head are rigidly mounted with respect to each other so that movement relative to each other is impossible. The tracer head impresses signals upon both the lateral control circuit 18 and the longitudinal control circuit 19 which react to drive motors 6 and 12 as desired at all times keeping the tracer head in contact with the work.

The description of the construction of the tracer head 1 shown in Figure 2 will be simplified by occasional references to Figure 3 and Figure 4, both of which show more clearly certain details of the lower part of the tracer head. The lower part of the tracer consisting of elements 20, 21, 22, 23, 24, 25, 26, 27 and 28 will be called the follower. The end element 20 of the follower is a cylinder journalled on bolt 21 acting as a shaft through the ball bearings 22 and 23 which are tightly forced and fixed in the cylinder 20. The ball bearings permit the cylinder 20 or roller 20, 22, 23 to roll along the edges of the pattern. The bolt 21 holding the cylinder 20 is mounted eccentrically in the circular plate 24. A dovetail tenon 30 (shown in Figure 4) has been cut on the circular plate 24 which meshes with the dovetail groove cut in plate 25. It is characteristic of dovetail joints that they permit movement of the two component parts in one and only one direction. In this case the dovetail joint is so cut that movement of plate 24 is possible with respect to plate 25 in the direction determined by a line drawn through the center of plate 24 and the center of the eccentrically located bolt 21. The effect of sliding the plates 24 and 25 in this direction is to increase or decrease the eccentricity of the roller with respect to the center of plate 25. Movement in this direction is controlled by micrometer screw 26 threading into the plate 24 and acting against the plate 25, together with the spring 27 which prevents any play between the two plates. As the entire follower assembly is attached to the main shaft 29 by means of set screw 28 it follows that rotation of the micrometer screw controls the eccentricity of the roller 20, 22, 23 with respect to the center of shaft 29. The purpose in altering the eccentricity of the roller in this manner will be made clear later.

In operation, when the tracer head is forced against the template, the eccentricity of the roller 20, 22, 23 with respect to the shaft 29 causes the shaft to rotate so that the center of the shaft 29 is at the minimum distance from the template. The force directing the tracer head against the template and the pressure of the template against the tracer head sets up a couple which causes this orientation to occur. The action is that of a cam forced against a surface; the cam rotates until the minimum radius of the cam is presented to the surface. The means causing the follower to force against the template at all times with a uniform pressure will be described later. In this way, as the tracer head is moved around a pattern, the shaft will be caused to rotate so that at all times the shaft is as close as possible to the pattern so that a 360° rotation of the shaft will be produced on completely circling any pattern. A line drawn through the center of the roller 20, 22, 23 and the center of shaft 29 will always be normal to the surface contacted by the follower.

The rotation of shaft 29 causes rotation of the armature 31 which is directly coupled to shaft 29 by set screw 33 which holds the armature shaft 32 in a clearance hole in shaft 29. The armature shaft is supported by the roller bearings 34 and 35. To simplify the drawing the manner in which these bearings are mounted to a casing or other fixed support is not shown. A coil 36 is wound on the armature, the axis of which is substantially vertical but is somewhat skewed for the purpose of distributing its magnetic field. Electrical connections to coil 36 are made through terminals 30 by means of the slip rings 37, 37 and the brushes 38, 38. Surrounding the armature is a stator 39 on which coils 40 and 41 are vertically wound in an identical manner except that their fields are perpendicular to each other.

The purpose of this construction may now be appreciated. As developed already, shaft 29 and the direct coupled armature 31 and coil 36 are caused to rotate by the pressure of the pattern against the roller 20 of the tracer head so that at all times a reference line through the center of the shaft and the cylinder 20 is normal to the surface contacted. When voltage is applied across coil 36 at the terminals 30, coil 36 may be said to be the primary of a rotary transformer inducing voltages in the secondary coils 40 and 41. The magnitude and phases of the induced voltages in these coils are dependent on the rotational position of coil 36 and uniquely characteristic of any position of coil 36 from 0° to 360° rotation caused by the orientation of the follower against the pattern. Plotting the magnitude of the induced voltage in each secondary coil with respect to the degree of rotation results in a sine curve for one coil and a cosine curve for the other coil. This follows from the fact that the fields of the secondary coils 40 and 41 are normal to each other. Therefore, for any rotational position of the primary coil 36 two voltages will be induced in the secondary coils 40 and 41 which may be represented vectorially as being at right angles to each other. The magnitude of one voltage will be proportional to the sine of the angle of rotation from any arbitrary reference direction, while the magnitude of the other voltage will be proportional to the cosine of the same angle. Adding these voltages vectorially gives a single resultant voltage, the magnitude of which is proportional to the square root of the sum of the sine squared plus the cosine squared. As the square root of the sum of the squares of the sine and the cosine is equal to one, or a constant, the magnitude of the resultant voltage is a constant at any rotational position. The principle developed, then, is that in rotating primary coil 36 from 0° to 360°, two voltages are induced in secondary coils 40 and 41 which may be added vectorially to show that the resultant voltage is constant in magnitude and varies in rotational direction from 0° to 360°.

This principle is utilized in the operation of the invention as follows. By resetting the set screw 33, the armature coil 36 can be rotated with respect to the shaft 29 and relative to stator coil 40 so that the voltage induced in coil 40 by an alternating current in primary coil 36 is a maximum when the follower is forced against an edge of the pattern which is directly longitudinal with respect to the horizontal bed on which the pattern is mounted. The voltage induced in secondary coil 40 when the follower is in contact with a directly lateral surface of the pattern is then zero and the voltage in intermediate cases is equal to the product of the maximum value and the cosine of the angle of rotation of coil 36 relative to its position when the maximum voltage is induced. The phase of the voltage induced in coil 40 is dependent on the direction of motion of the tracer head; assuming the tracer is moving clockwise around the pattern if the voltage is said to be positive in phase when the follower is moving from left to right along a longitudinal edge of the pattern, then the phase will be negative when the follower is moving from right to left along a longitudinal edge of the pattern as the primary coil will differ 180° in position. Therefore, the voltage induced in coil 40 under these conditions supplies a suitable signal for the longitudinal or right-left control circuit 19, controlling the right and left motion sense of the longitudinal motor drive and the longitudinal component of speed.

As the field of coil 41 is perpendicular to the field of coil 40, the voltage induced in coil 41 by the flow of alternating current in coil 36 will be a maximum when the tracer head is in contact with a directly lateral surface rather than a longitudinal surface as for coil 40. The voltage induced in coil 41 is then zero when the follower is in contact with a directly longitudinal surface and in intermediate cases is equal to the product of the maximum value and the cosine of the angle of rotation relative to the position of coil 36 when the voltage induced in coil 40 is zero. The phase of the induced voltage will be positive for lateral motion in one direction and negative for lateral motion in the opposite direction as described for the other secondary coil 40. These lateral directions may be termed "in-out" directions, as distinguished from the longitudinal or right-left directions. Therefore, the voltage induced in coil 41 supplies a suitable signal for the lateral or in-out control circuit 18 controlling the backward and forward motion sense of the lateral motor drive 12 and the lateral component of speed.

Any desired means may be used for the control units 18 and 19 controlling the lateral and longitudinal movements of the horizontal bed 5. However, I prefer to use the type indicated in the co-pending application of William G. Gorton, Serial No. 599,988, filed June 18, 1945, now Patent No. 2,473,423, dated June 19, 1949. It is a characteristic of this type of control, and an essential characteristic of any control system used, that the speed of the motor controlled is directly proportional to the input signal voltage of the controller. Therefore, the principle developed above regarding the vectorial addition of the component voltages of the system may be restated in terms of the lateral and longitudinal components of the speed of the horizontal bed 5 controlled by these voltages. That is, in rotating the primary coil 36 from 0 to 360°, a longitudinal component of speed will be imparted to the movable bed by motor control 19 and the motor 6 and a lateral component of speed will be imparted to the bed by motor control 18 and motor 12. The resultant of these two components of speed may be obtained by vector addition and is equal in magnitude to a constant and in direction, determined by the orientation of the primary coil of the transformer as described, is tangential to the edge of the pattern. This system then, provides a means for controlling the movement of horizontal bed 5 so that the edge of the pattern is caused to move along the follower at a constant speed directed at all times in a direction tangential to the point of contact of the follower and the pattern.

As mentioned before, a positive force is required to force the tracer head against the template so as to maintain the orientation of the shaft with respect to the pattern. This force can be provided by introducing a voltage in the control circuit so that at all times there is a resulting motion sense of the follower directly into the pattern. This may be simply accomplished by loosening set screw 33 and rotating the armature 36 with respect to the main shaft 29. The degree of rotation is not critical and for a system wherein the tracer travels around the pattern clockwise, a clockwise rotation of the armature may be made at any angle less than 90° although preferably less than 45°. This rotation creates the desired voltage component in the control system providing a motion sense into the pattern, causing the tracer head to force against the pattern. In the system as heretofore described, applying the voltage by the rotational adjustment of the armature shaft, would change the movement of the follower relative to the pattern from a tangential course to a collision course. Destructive strains would be set up in the tracer head. Consequently, the voltage controlling motion sense into the pattern is only useful when it has caused a slight movement of the pattern against the follower, and must be cancelled when the resulting pressure of the pattern against the follower exceeds a reasonable working pressure. This compensating cancellation of the crowding voltage is accomplished by means of a mechanical strain indicating system which responds to pressure against the follower, varying the coupling of a transformer which causes a voltage to be developed cancelling the voltage causing a motion sense of the follower into the pattern.

The elements constituting the mechanical strain indicating system are shown in Figure 4. The ring 42 is fixed to the casing 43 by set screws 44. Suspended from the ring 42 by spring wires 45, 45, 45, and 45 is a retaining ring 46. A ball bearing 47 is held by a forced fit in this retaining ring. The collar of the ball bearing closely fits the shaft 29 but the upper surface of the retaining ring does not contact the shaft. (See Figure 3.) Nor does the retaining ring 46 contact the casing 43. A clearance is also provided between the ball bearing 47 together with the retainer 46 and the upper plate 25 of the follower. Therefore, when horizontal force is applied by the pattern against cylinder 20 of the tracer head this construction permits a slight horizontal displacement of the entire assembly of elements 46, 47, and 20—28 relative to the casing 43. At the same time this construction does not interfere with the rotation of the shaft 29 and the follower; the ball bearing 47 permits the rotation of these elements as described before without affecting the operation of the strain indicating system now being described. The suspension wires 45 supporting the ball bearing and the retainer present little resistance to horizontal movements of these elements and the long shaft 29 and 32 flexes easily so that the horizontal displacement is responsive to slight changes in pressure against the follower. Two lever arms 48 and 49 are attached to the fixed ring 42 by means of the spring hinges 50, 50 and the screws 51. These lever arms are coupled to the upper surface of the retaining ring 46 by the flat spring stock levers 52 and 53 and the screws 54. The flat spring stock levers are placed so that one is parallel and the other is perpendicular to the direction of longitudinal or right-left travel of the bed 5. As stated, this system provides a mechanical method for indicating pressure of the pattern against the follower. When the pattern is forced against the follower, the retaining ring 46 and the lower part of the tracer head are displaced with respect to the fixed ring 42 as described above. This displacement causes movement of hinged levers 48 and 49 by the flat spring stock levers 52 and 53. Due to the flat spring construction of lever 52, lever 52 is not sensitive to longitudinal or right-left pressure against the follower, bending readily without moving the hinged lever 48. However, lever 52 is stiff as to lateral or in-out pressure against the follower, so that the magnitude of the movement of the lever system 52 and 48 is proportional to the in-out component of pressure against the follower. The movement of the drive rod 55 which is driven by these levers will be up or down depending upon whether the follower in following a clockwise path around the pattern is moving from right to left or from left to right, respectively, along a longitudinal edge. Similarly levers 53 and 49 are not sensitive to lateral or in-out pressure against the follower but respond to longitudinal or right-left forces so that the movement of this lever system is proportional to the right-left component of pressure against the follower. The movement of drive rod 56 driven by the levers 49 and 53 will be up or down depending upon whether the follower, in following a clockwise path around the pattern is moving in or out along a lateral edge.

Referring back to Figure 2, movements of these lever systems responsive to pressure against the follower are transmitted to the variably coupled transformers 181 and 182 by means of the drive rods 55 and 56 which operate the rockers 57 and 58 causing movements of the drive members 59 and 60 of the transformers 81 and 82. The rockers 57 and 58 hinge on flat spring stock 61 supported by the top of the tracer head casing 62 which may be the bottom of the housing for the remaining components of the tracer head. For simplicity this housing is not shown in the drawing.

The variably coupled transformers operate on the principles fully described in the pending application of Robert A. Fryklund, Serial No. 695,571, filed September 7, 1946, now Patent No. 2,470,244, dated May 17, 1949. Coils 63 and 64 are primary coils supported by the fixed frames 65 and 66. The secondary coils 67 and 68 are supported by the movable frame 71, and the secondary coils 69 and 70 are supported by the movable frame 72. Movable frames 71 and 72 are flexibly supported by means of the spring bars 73 which are clamped to the fixed frames 65 and 66 by means of clamping members 74 held by screws 75. The movable frames 71 and 72 are driven by the drive members 59 and 60 through clearance holes in the lower clamping members. Movement of the frames 71 and 72 by these drive members varies the distance between the secondary coils mounted on them, and the primary coils mounted on the fixed frames 71 and 72.

Figure 1 shows the electrical operation of this arrangement. Referring to transformer 181, when no force is applied to the drive member 59 the secondary coils 67 and 68 are equi-distant from the primary coil 63. Since coils 67 and 68 are connected series opposing, voltages induced in coil 67 under these conditions will equal and be opposite in phase to voltages induced in coil 68. The net voltage induced across the two coils will then be zero. However, when force is applied to drive member 59 of transformer 181, actuated by the pressure of the pattern against the follower, primary coil 63 will be moved closer to secondary coil 67 or 68 and further from secondary coil 68 or 67 respectively. In this case the voltage induced in the secondary coils will not be equal as the primary is more closely coupled to one of them. A net voltage will be produced across both coils, the phase of which is dependent on the direction of movement of drive member 59 and movable frame 65, and the magnitude of which is proportional to the extent of the movement. This voltage is applied to the stator coil 41 controlling lateral movements by connecting coils 67 and 68 in series with coil 41. The phases of coils 67 and 68 must be so determined that voltages induced in them by lateral force against the follower will oppose the voltage causing crowding of the pattern against the follower.

The effect of this can best be seen by considering the voltages set up in the entire system in a particular situation. For example, if the system is set up so that the tracing head is moving clockwise around a pattern, on any part of the pattern on which the follower is moving directly longitudinally, there will be a voltage induced in coil 49 controlling the longitudinal motion sense and the longitudinal component of speed. The aforementioned rotation of the armature and coil 36 with respect to shaft 29 will also cause a voltage to be induced in coil 41 producing a lateral motion sense directly into the pattern causing the follower to crowd into the template. If the motion sense is from left to right then the pressure on the follower will cause the pressure indicating mechanism of Figure 4 to pull lever 48 and drive rod 55 down, imparting an upward motion to drive member 59 through rocker 57. This will cause coil 63 of the transformer 181 to couple more closely to coil 68 creating a net voltage across coils 67 and 68 which is applied to the series connected lateral control coil 41. The phase of this voltage will oppose the voltage in coil 41 causing the lateral motion sense of the tracer into the pattern. The magnitude of the net voltage induced in coils 67 and 68 by this means is such that the opposing voltage in coil 41 may be fully cancelled when a given pressure of the pattern against the follower is attained. Likewise, if the tracer head is moving from left to right, rather than right to left, the lateral motion sense and the phase of the voltage in coil 41 will be reversed. Pressure of the follower against the pattern under these conditions will cause coil 63 to move closer to coil 67 rather than coil 68 resulting in a net voltage across coil 67 and 68 which will also be opposite in phase to that formerly produced. This voltage will then cancel the voltage in coil 41 as before.

In the same way the longitudinal pressure of the follower against the template as a lateral edge is being traced may be controlled by the longitudinal strain indicating system 53, 49, 56, 58 and the variably coupled transformer 182, the output of which is controlled by the movement of drive member 60.

By this means the tracer head is forced to precisely follow the outline of the pattern. Any tendency to break contact with the pattern reduces the voltage developed in the transformers 81 and 82 permitting the voltage controlling motion sense into the pattern to prevail, maintaining the contact. The balance between these voltages results in operation at a constant pressure between the tracer head and the template. The magnitude of the pressure will be determined by the degree of rotation given the armature with respect to the shaft 29 creating the crowding voltage. As the degree of rotation of the armature is increased, the voltage component causing motion sense of the follower into the pattern is increased. A greater pressure will then be required against the follower to provide sufficient movement of the strain indicating lever system to induce a large enough voltage to cancel the crowding voltage. Micrometer screw 26 which controls the eccentricity of the roller 20, 22, 23 with respect to the shaft 29 serves an important function in this connection. In order for precise reproductions of a pattern to be made it is necessary that the diameter of the cutting head be equal to what may be called the effective diameter of the follower. If no pressure were applied against the follower, this diameter would be twice the minimum distance from the center line of shaft 29 to the line of contact of the cylinder 20. However, pressure against the follower slightly displaces the follower as described increasing the effective diameter somewhat. By altering the eccentricity of the roller by means of the micrometer screw 26, this effect may be cancelled, correcting as well for undersize or oversize cutters. It may also be noted that adjustments of the micrometer screw may also be made to purposely produce a result somewhat larger or smaller than the pattern.

Figure 1 shows the entire electrical circuit of the system. The primary 36 of the armature and coils 63 and 64 of the variably coupled transformers are supplied from a source of alternating current 76 through transformer 77. The voltage supplied the rotating primary coil 36 is controlled through potentiometer 78. As the magnitude of the voltage in armature coil 36 determines the voltage induced in the stator coils 40 and 41 which control the speed of the drive motors 6 and 12, potentiometer 78 controls the velocity of the tracer head tangential to the contour. This follows since, as developed above, the characteristics of the system are such that for a particular value of primary current in coil 36, the tangential velocity will be constant around the entire pattern. The stator coil 40 controlling longitudinal motion is connected in series with coils 69 and 70 of the variably coupled transformer 82 which controls lateral pressures against the tracer. The voltage developed across the secondary coils 69 and 70 of transformer 82 and series connected primary coil 40 is impressed across the longitudinal control circuit 19. Similarly the voltage developed across series connected stator coil 41 controlling lateral motion and secondary coils 67 and 68 of the transformer 81 controlling longitudinal pressures is impressed across the terminals of the lateral control circuit 18. As stated, any desired means may be used for the control circuits 18 and 19, although I prefer to use the type indicated in the co-pending application of William G. Gorton, Serial No. 599,988 filed June 18, 1945, now Patent No. 2,473,423, dated June 19, 1949.

If the circuit of Fig. 1 in this companion application is used the voltage developed across series connected coils 40, 69, and 70 and series connected coils 41, 67 and 68 will be substituted for the syncho 8, the rotor 9, and the resistance connection across it of the Gorton application, the reduction gear 10 and the manual control 11 being omitted. In this case, the motor 1 of the Gorton circuit will be replaced by the motor 6 in the longitudinal control system and the motor 1 of Gorton will be replaced with motor 12 in the lateral control system.

Figure 5 shows an alternative construction for the pressure indicating system of Figure 4. In Figure 5 the broad sleeve 79 replaces the ring 42, serving the same function. Levers 80 and 81, corresponding to levers 48 and 49 of Figure 4 have rigid arms downward 82, 82, 85, 85 which do not contact the ball bearing retainer 46. These arms are connected to spring wires 83, 83 and 86, 86 held by the rigid posts 84 of retainer 46. The retainer is fixed to ball bearing 47 by a forced fit. Sufficient clearance is left so that posts 84 do not contact sleeve 79. When force is applied against the follower, displacing ring 46 with respect to sleeve 79, the spring wires will transmit only that component of displacement directed along their axes.. Therefore, wires 83, 83 and lever 80 will be responsive to the lateral component of pressure against the follower while wires 86, 86 and lever 81 will be responsive to the longitudinal component of pressure against the follower. The function of the mechanism of Figure 5 is therefore the same as that of the mechanism of Figure 4.

To operate the invention, the pattern and work block may be mounted on the movable bed so that they contact the tracer head and cutter head respectively. In this case, the operation will be fully automatic on switching on the alternating current source 76. If it is impractical or undesirable to set-up the work with the tracer head and cutter head in contact with the pattern and work block, the system may be put in operation and the tracer head rotated manually until the cutter head has progressed into the work sufficiently to permit contact of the pattern by the follower. At that time the operation will become fully automatic.

Of course it is to be understood that this invention is not limited to the particular exemplification described above. Various modes of operating the invention will suggest themselves to those skilled in the art. For example, in a particular application it may be desirable to mount both pattern and piece so that they are turning on a direct coupled axis. The pattern and work may be mounted in an inclined or vertical plane rather than a horizontal plane as herein described. The work and cutting head may be mounted on an independent machine making it possible to reproduce the pattern on a larger or smaller scale by the proper mechanical linkages. By reversing the direction of rotation of one of the feed screws of the independent machine, a mirror image of the pattern may be produced. It is accordingly desired that the appended claims be given a broad interpretation commensuate with the scope of the invention within the art.

What is claimed is:

1. A tracer element comprising two members, the first of said tracer members being fixed and the second of said tracer members being rotatable and displaceable with respect to the first member, a rotary transformer means responsive to the rotation of said second member for producing a first pair of voltages characteristic of the relative angular position of the tracer members, variably coupled transformer means responsive to the displacement of said second member for producing a second pair of voltages characteristic of the direction and amount of displacement from an initial position relative to the first member, and means to influence each member of said second pair with a different member of said first pair.

2. A tracer element comprising two members, the first of said tracer members being fixed and the second of said tracer members being rotatable and displaceable with respect to the first member, a rotary transformer means having a stator element which is mounted on said first tracer member and a rotor element which is operatively connected to the said second tracer member, coil means mounted on said rotor and stator elements, one of said coil means being in two angularly related parts for producing a first pair of voltages characteristic of the relative angular position of the tracer members, variably coupled transformer means operatively connected to the said second tracer member for producing a second pair of voltages characteristic of the direction and amount of displacement from an initial position relative to the first member, and means to influence each member of said second pair with a different member of said first pair.

3. A tracer element comprising two members, the first of said tracer members being fixed and the second of said tracer members being rotatable and displaceable with respect to the first member, a rotary transformer means having a stator element which is mounted on said first tracer member and a rotor element which is operatively connected to the said second tracer element, coil means mounted on said rotor and stator elements, one of said coil means being in two angularly related parts for producing a first pair of voltages characteristic of the relative angular position of the tracer members, mechanical lever systems coupling said first and second tracer members for producing movements of the levers characteristic of the direction and amount of the displacement of the second tracer member from an initial position relative to the first member, variably coupled transformers operatively connected to said drive lever systems for producing a second pair of voltages characteristic of the direction and amount of the displacement of the tracer members, and means to influence each member of said second pair with a different member of said first pair.

4. A tracer element adapted to be stressed, means for converting stresses against the tracer element into voltage vectors and a mechanical couple, a rotatable member of said tracer element having a rotational position controlled by said couple, means for producing other voltage vectors characteristic of the rotational position of the said tracer member, and means controlled by the vector sum of said voltage vectors providing movement to produce a stress of said tracer element in one direction.

5. A tracer element, a head on said tracer element adapted to be stressed, means for converting stresses against the tracer head into forces of electrical vector components and of a couple, and means translating said forces and couple to produce a control effect in the same directions of the vector components, with the couple providing the tracer head movement to produce a stress of the tracer head in one direction.

6. A tracer comprising supporting means and an end element, means for supporting said end element from said supporting means so that it is rotatable and displaceable relative to the said supporting means responsive to pressure against the end element, means actuated by such rotation and displacement for producing separate signal voltages due to each, said voltages each having two components corresponding to rectangularly related components of the respective forces producing said rotation and said displacement, and means to influence each component of one voltage with a different component of the other voltage.

7. In combination in a control system, a tracer element comprising a fixed member and a movable member, two mechanical lever systems coupling the two members, said lever systems being selectively responsive to the relative displacement of the two members in directions perpendicular to each other, two variably coupled transformers operatively connected to the lever systems whereby the coupling of the transformers is controlled by said lever systems producing signal voltages characteristic of the amount and direction of the relative displacement of the two assemblies.

8. In a control system, a tracer element comprising in combination, a fixed member and a moveable member, means for flexibly connecting said members permitting displacement of the moveable member from an initial position relative to the fixed member, two lever arms perpendicular to each other extending from the fixed member and hinged thereto on flat spring stock hinges, flat spring stock coupling members connecting the said lever arms to the said movable tracer member, whereby each of said lever arms is operated by displacement of the moveable member relative to the fixed member in directions parallel to each of the levers.

9. In a control system, a tracer element comprising in combination, a first member and a second member, means for flexibly connecting said members permitting displacement of the two members in parallel reference planes from an initial position of the two members relative to each other, two L shaped levers extending from the first member and hinged thereto on flat spring stock hinges having hinging axes parallel to the reference planes and perpendicular to each other, one arm of each lever extending in a plane parallel to the reference planes and the other arm of each of said levers extending toward the second member, flexible coupling members connecting the second member to the arms of the levers extending toward the second member, said flexible coupling members being positioned in directions parallel to the arms of the L shaped levers which lie in a plane parallel to the reference planes.

10. A tracer element having a supporting member and a movable member, means to support said movable member from said supporting member permitting relative rotation and displacement of said movable member with respect to said supporting member, rotary transformer means having first and second relatively rectangularly disposed coils of a stator mounted on said supporting member and a rotor coil operatively connected to the said movable member for producing in said first stator coil a first electrical vector component and in said second stator coil a second electrical vector component, first and second variably coupled transformer means operatively connected between said supporting member and said movable member for producing a third electrical vector component corresponding to a first direction of displacement of said movable member relative to said mounting member and a fourth electrical vector component corresponding to a second rectangularly related direction of said movement, means linking said first and third electrical vector components together, and means linking said second and fourth electrical vector components together.

ROBERT A. FRYKLUND.
WILLIAM G. GORTON.

REFERENCES CITED

The following references are of record in the file of this patent:

UNITED STATES PATENTS

| Number | Name | Date |
|---|---|---|
| 1,959,178 | Sassen | May 15, 1934 |
| 2,047,922 | Seligman | July 14, 1936 |
| 2,170,087 | McPherson | Aug. 22, 1939 |
| 2,178,131 | Zwick | Oct. 31, 1939 |
| 2,388,555 | Kuehni | Nov. 6, 1945 |
| 2,403,958 | Seeley | July 16, 1946 |

FOREIGN PATENTS

| Number | Country | Date |
|---|---|---|
| 702,468 | Germany | Feb. 8, 1941 |